United States Patent
MacLaughlin et al.

(10) Patent No.: US 10,997,845 B2
(45) Date of Patent: May 4, 2021

(54) PARTICLE DETECTORS WITH REMOTE ALARM MONITORING AND CONTROL

(71) Applicant: Particle Measuring Systems, Inc., Boulder, CO (US)

(72) Inventors: Scott MacLaughlin, Boulder, CO (US); Matt Michaelis, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 0 days.

(21) Appl. No.: 17/063,779

(22) Filed: Oct. 6, 2020

(65) Prior Publication Data
US 2021/0104146 A1  Apr. 8, 2021

Related U.S. Application Data

(60) Provisional application No. 62/911,810, filed on Oct. 7, 2019.

(51) Int. Cl.
| | | |
|---|---|---|
| G08B 21/14 | (2006.01) | |
| G08B 27/00 | (2006.01) | |
| G08B 21/18 | (2006.01) | |

(52) U.S. Cl.
CPC .......... *G08B 21/14* (2013.01); *G08B 21/182* (2013.01); *G08B 27/008* (2013.01)

(58) Field of Classification Search
CPC ..... G08B 21/14; G08B 27/008; G08B 21/182
See application file for complete search history.

(56) References Cited

U.S. PATENT DOCUMENTS

| | | |
|---|---|---|
| 4,594,715 A | 6/1986 | Knollenberg |
| 4,798,465 A | 1/1989 | Knollenberg |
| 4,893,928 A | 1/1990 | Knollenberg |
| 5,282,151 A | 1/1994 | Knollenberg |
| 5,283,199 A | 2/1994 | Bacon, Jr. et al. |
| 5,671,046 A | 9/1997 | Knowlton |
| 5,726,753 A | 3/1998 | Sandberg |
| 5,751,422 A | 5/1998 | Mitchell |

(Continued)

FOREIGN PATENT DOCUMENTS

| | | |
|---|---|---|
| EP | 2279402 | 8/2015 |
| WO | WO 2007/144835 | 12/2007 |

OTHER PUBLICATIONS

Search Report and Written Opinion, dated Jan. 11, 2021, corresponding to International Patent Application No. PCT/US2020/054330, 10 pages.

*Primary Examiner* — Ojiako K Nwugo
(74) *Attorney, Agent, or Firm* — Leydig, Voit & Mayer, Ltd.

(57) ABSTRACT

The invention generally provides devices and methods for particle detection for minimizing human-caused contamination in manufacturing environments requiring low levels of microbes, such as cleanroom environments for electronics manufacturing and aseptic environments for manufacturing pharmaceutical and biological products, such as sterile medicinal products. Methods of the invention may incorporate wirelessly transmitting an alarm signal from a particle detector to a remote device, replicating a graphical user interface of the particle detector on an electronic display of the remote device, and passing one or more user instructions from the remote device to the particle detector via the replicate graphical interface of the remote device.

17 Claims, 4 Drawing Sheets

(56) References Cited

U.S. PATENT DOCUMENTS

| | | |
|---|---|---|
| 5,764,150 A * | 6/1998 | Fleury ............... G01N 33/0063 340/632 |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 6,167,107 A | 12/2000 | Bates |
| 6,246,474 B1 | 6/2001 | Cerni et al. |
| 6,275,290 B1 | 8/2001 | Cerni et al. |
| 6,615,679 B1 | 9/2003 | Knollenberg et al. |
| 6,639,670 B2 * | 10/2003 | Carpenter ......... G01N 15/0205 356/335 |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,096,125 B2 | 8/2006 | Padmanabhan et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,439,855 B1 | 10/2008 | Yufa |
| 7,456,960 B2 | 11/2008 | Cerni et al. |
| 7,576,857 B2 | 8/2009 | Wagner |
| 7,667,839 B2 | 2/2010 | Bates |
| 7,746,469 B2 | 6/2010 | Shamir et al. |
| 7,796,255 B2 | 9/2010 | Miller |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,800,383 B2 | 8/2014 | Bates |
| 8,869,593 B2 | 10/2014 | Gorbunov et al. |
| 9,280,884 B1 | 3/2016 | Schultz et al. |
| 9,631,222 B2 | 4/2017 | Ketcham et al. |
| 9,638,665 B2 | 5/2017 | Gorbunov |
| 9,677,990 B2 | 6/2017 | Pariseau et al. |
| 9,682,345 B2 | 6/2017 | Gromala et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,989,462 B2 | 6/2018 | Lumpkin et al. |
| 10,094,755 B1 * | 10/2018 | Chandler ............ G01N 15/0205 |
| 10,197,487 B2 | 2/2019 | Knollenberg et al. |
| 10,345,200 B2 | 7/2019 | Scialo et al. |
| 10,371,620 B2 | 8/2019 | Knollenberg et al. |
| 10,792,694 B2 | 10/2020 | Gorbunov et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 2002/0030113 A1 * | 3/2002 | Abuzeid ............... G05D 27/02 236/4 |
| 2005/0028593 A1 | 2/2005 | Rodier |
| 2009/0078862 A1 | 3/2009 | Rodier et al. |
| 2009/0190128 A1 | 7/2009 | Cerni et al. |
| 2009/0268202 A1 | 10/2009 | Wagner |
| 2012/0162536 A1 | 6/2012 | Sibilsky et al. |
| 2015/0000595 A1 | 1/2015 | Gorbunov et al. |
| 2015/0259723 A1 | 9/2015 | Hartigan et al. |
| 2015/0323941 A1 | 11/2015 | Pariseau et al. |
| 2016/0063833 A1 | 3/2016 | Schultz et al. |
| 2016/0063841 A1 * | 3/2016 | Schultz ............... G06F 13/4221 340/601 |
| 2016/0126081 A1 | 5/2016 | Gorbunov |
| 2016/0139013 A1 | 5/2016 | Gorbunov |
| 2017/0248509 A1 * | 8/2017 | Godoy ............... G01N 15/1431 |
| 2018/0036469 A1 | 2/2018 | Crnkovich et al. |
| 2018/0266933 A1 | 9/2018 | Tamraz et al. |
| 2019/0234631 A1 * | 8/2019 | Wallace ............... F24F 11/62 |
| 2019/0250785 A1 | 8/2019 | Pandolfi et al. |
| 2019/0346345 A1 | 11/2019 | Scialo et al. |
| 2020/0072729 A1 | 3/2020 | Lumpkin et al. |
| 2020/0150017 A1 | 5/2020 | Bates et al. |
| 2020/0150018 A1 | 5/2020 | Shamir |
| 2020/0158603 A1 | 5/2020 | Scialo et al. |
| 2020/0240896 A1 | 7/2020 | Karasikov et al. |
| 2020/0355599 A1 | 11/2020 | Rodier et al. |
| 2021/0044978 A1 | 2/2021 | Michaelis et al. |
| 2021/0063349 A1 | 3/2021 | Rodier et al. |

* cited by examiner

PARTICLE DETECTORS WITH REMOTE ALARM MONITORING AND CONTROL

CROSS-REFERENCE TO RELATED APPLICATIONS

This application claims the benefit of priority to U.S. Provisional Patent Application No. 62/911,810, filed Oct. 7, 2019, which is hereby incorporated by reference in its entirety.

STATEMENT REGARDING FEDERALLY SPONSORED RESEARCH OR DEVELOPMENT

Not applicable.

BACKGROUND OF INVENTION

This invention is in the field of particle sampling, collection and analysis. This invention relates generally to particle detectors having remote alarm monitoring and control capabilities.

Cleanrooms and clean zones are commonly used in semiconductor and pharmaceutical manufacturing facilities. For the semiconductor industry, an increase in airborne particulate concentration can result in a decrease in fabrication efficiency, as particles that settle on semiconductor wafers will impact or interfere with the small length scale manufacturing processes. For the pharmaceutical industry, where this type of real-time efficiency feedback is lacking, contamination by airborne particulates and biological contaminants puts pharmaceutical products at risk for failing to meet cleanliness level standards established by the US Food and Drug Administration (FDA) and other foreign and international health regulatory agencies.

Standards for the classification of cleanroom particle levels and standards for testing and monitoring to ensure compliance are provided by ISO 14664-1 and 14664-2. Aerosol optical particle counters are commonly used to determine the airborne particle contamination levels in cleanrooms and clean zones, and liquid particle counters are used to optically measure particle contamination levels in process fluids. Where microbiological particles are a particular concern, such as in the pharmaceutical industry, not only is quantification of the number of airborne particles important, but characterizing the viability and identity of microbiological particles is also at issue. ISO 14698-1 and 14698-2 provide standards for evaluation of cleanroom and clean zone environments for biocontaminants.

Currently, collection and analysis of airborne biological particles is commonly achieved using a variety of techniques including settling plates, contact plates, surface swabbing, fingertip sampling and impactor-based active air samplers. Cascade impactors have traditionally been used for collection and sizing of particles. In these devices, a series of accelerations and inertial impacts successively strip smaller and smaller particles from a fluid flow. Each stage of an inertial impactor operates on the principle that particles suspended in air can be collected by forcing a dramatic change in the direction of the particle-containing airflow, where the inertia of the particle will separate the particle from the airflow streamlines and allow it to impact on the surface.

As requirements for lower viable and non-viable particle concentrations increase because of increased quality standards and governmental regulatory requirements there is a need for advancement in sampling technology in order to reduce the risk of outside contamination from human interactions within the controlled environment.

Maintaining sterile processing operations in aseptic manufacturing, and cleanroom environments is required in a number of industries such as pharmaceuticals, biopharmaceuticals, parenteral drugs and medical devices, and microfabrication among others. Maintaining operations under stringent specifications for particulate matter and biological load can be critical to successful manufacturing in each of these industries. Human interaction in the cleanroom should be minimized to achieve these goals.

Furthermore, regardless of the industry in which they are employed, particle detectors are often utilized in loud environments and in environments containing multiple devices equipped with audible alarms, for example multiple particle detectors, atmospheric monitors, process monitors, among others. Thus, audible alarms that emanate from the particle detection device itself may not be heard, or it may be difficult to ascertain which device has entered an alarm state. Additionally, audible and/or visual alarms may not be visible from locations remote of the particle detection devices It can be seen from the foregoing that there remains a need in the art for particle collection, analysis, and characterization systems for sampling and collecting particles and/or organisms from controlled environments with improved remote alarm monitoring and control capabilities.

SUMMARY OF THE INVENTION

Provided herein are systems and methods for remote alarm monitoring and control of particle detectors. A method of operating a particle detector comprises introducing a particle-containing fluid to an inlet of the particle detector; sampling particles in the fluid in a sampling region of the particle detector to produce particle data values, and determining that at least one of the particle data values exceeds a predetermined threshold. In response to the determining step, an alarm signal may be wirelessly transmitted to a remote device. An alarm of the remote device may be activated in response to the wirelessly transmitting step.

In one embodiment, a method of operating a particle detector comprises displaying a graphical user interface on an electronic display of the particle detector and setting one or more particle monitoring parameters via the graphical user interface. A particle-containing fluid may be introduced to the inlet of the particle detector and the particles may be sampled in the fluid in a sampling region of the particle detector. In response to the sampling step, an alarm condition may be detected. In response to the detecting step, an alarm signal may be wirelessly transmitted to the remote device. Additionally or alternatively, the particle detector may be wirelessly queried via the remote device.

In one embodiment, the wireless querying step may comprise sending particle sampling data from the particle detector to the remote device and replicating the graphical user interface of the particle detector on an electronic display of the remote device. The wireless querying step may comprise passing one or more user instructions from the remote device to the particle detector via the replicate graphical interface of the remote device and executing the one or more user instructions on the particle detector.

In some embodiments, the step of replicating the graphical user interface of the particle detector on the electronic display of the remote device comprises reproducing one or more icons or visual indicators from the graphical user interface of the particle monitor to the replicate graphical interface of the remote device. In some embodiments, the one or more icons or visual indicators include a battery life indicator, an indicator of the location of the particle detector, and/or an alarm source indicator.

In some embodiments, the step of replicating the graphical user interface of the particle detector on the electronic display of the remote device comprises duplicating one or more tables of particle detection data from the graphical user interface of the particle monitor to the replicate graphical interface of the remote device.

In some embodiments, the one or more user instructions comprise adjusting an alarm threshold, acknowledging an alarm, terminating a sampling protocol, and/or initiating a sampling protocol.

In one embodiment, in response to the step of detecting an alarm condition, an alarm of the particle detector may be activated. The alarm may be an audible alarm of the particle detector, a visual alarm of the particle detector, and/or a tactile alarm of the particle detector. In some embodiments, the alarm may be wirelessly transmitted to the remote device and then replicated on the remote device. The alarm of the remote device may be an audible alarm of the remote device, a visual alarm of the remote device, and/or a tactile alarm of the remote device.

In some embodiments, the tactile alarm of the particle detector comprises a vibration produced by the particle detector. In some embodiments, the tactile alarm of the remote device comprises a vibration produced by the remote device.

In some embodiments, the remote device is a wearable device. In some embodiments, the remote device is a smartphone or a smartwatch.

In some embodiments, the particle detector is a portable particle detection device. In some embodiments, the particle detector is a particle sampler or a particle counter. In some embodiments, the particle detector is a microbial impactor or an optical particle counter.

In one embodiment, the particle detector is an optical particle detector and the sampling step comprises detecting particles via scattered light in the sampling region of the device. In some embodiments, the wirelessly transmitting and/or wirelessly querying steps occur via one of a WiFi or BLUETOOTH communication protocol.

In some embodiments, the method includes wirelessly querying the particle detector via the remote device. In some embodiments, the querying comprises sending particle data values from the particle detector to the remote device. In one embodiment, the querying comprises sending location information from the particle detector to the remote device, wherein the location information corresponds to a location of the particle detector.

In some embodiments, the method includes passing one or more user instructions from the remote device to the particle detector; and executing the one or more user instructions on the particle detector. The one or more user instructions may comprise at least one of: adjusting an alarm threshold, acknowledging an alarm, terminating a sampling protocol, initiating a sampling protocol.

In some embodiments, an audible alarm of the particle detector may be activated in response to the step of determining that at least one of the particle data values exceeds a predetermined threshold. In some embodiments, a visual alarm of the particle detector may be activated in response to the step of determining that at least one of the particle data values exceeds a predetermined threshold. In some embodiments, an audible alarm and a visual alarm of the particle detector may be activated in response to the step of determining that at least one of the particle data values exceeds a predetermined threshold.

In some embodiments, the step of activating an alarm of the particle detector comprises at least one of one: activating an audible alarm of the particle detector; activating a visual alarm of the particle detector; and activating a vibratory alarm of the particle detector. In some embodiments, the step of activating an alarm of the remote device comprises all of: activating an audible alarm of the remote device; activating a visual alarm of the remote device; and activating a vibratory alarm of the remote device.

In some embodiments, the remote device is a wearable device. In some embodiments, the remote device is a smartphone or a smartwatch.

In some embodiments, the particle detector is a portable particle detection device. In some embodiments, the particle detector is a particle sampler or a particle counter. In some embodiments, the particle detector is a microbial impactor or an optical particle counter. In one embodiment, the particle detector is an optical particle detector and the sampling step comprises detecting particles via scattered light in the sampling region of the device.

In one embodiment, the wirelessly transmitting step occurs via one of a WiFi or BLUETOOTH communication protocol.

In one embodiment, a method of operating a particle detector comprises introducing a particle-containing fluid to an inlet of the particle detector; sampling particles in the fluid in a sampling region of the particle detector to produce particle data values, and determining that at least one of the particle data values exceeds a predetermined threshold. In response to the determining step, an alarm signal may be wirelessly transmitted to a remote device. An alarm of the remote device may be activated in response to the wirelessly transmitting step. A graphical user interface may be displayed on an electronic display of the particle detector. The predetermined threshold may be set via the graphical user interface. The particle detector may be wirelessly queried via the remote device. The querying may comprise: sending particle data values from the particle detector to the remote device; and replicating the graphical user interface of the particle detector on an electronic display of the remote device. one or more user instructions may be passed from the remote device to the particle detector via the replicate graphical interface of the remote device. The one or more user instructions may be executed on the particle detector.

In one embodiment the method may include reproducing one or more icons or visual indicators from the graphical user interface of the particle monitor to the replicate graphical interface of the remote device. In one embodiment, the one or more icons or visual indicators include at least one of: a battery life indicator, an indicator of the location of the particle detector, and an alarm source indicator. In one embodiment, the replicating step comprises duplicating one or more tables of particle detection data from the graphical user interface of the particle monitor to the replicate graphical interface of the remote device.

The devices and methods of the present invention are versatile and support a range of particle sampling, monitoring and analysis applications. For example, the present devices and methods are useful for applications involving preparation, handling, manufacture, storage, transfer, fill and/or finish of sterile pharmaceutical or biological agents, pharmaceutical or biological containers, pharmaceutical or biological delivery devices, medical devices including implantable devices, blood, cell and tissue materials. In addition, the present devices and methods are useful for monitoring and characterizing biological particles in healthcare environments, such as hospitals, operating rooms, surgical suites and compounding pharmacies. Other applications of the present devices and methods include the preparation, manufacture, storage, transfer or processing of cosmetics, personal care products, food and beverages.

In one embodiment, a particle detector system comprises a particle detector and a remote device. The particle detector may comprise a first electronic display configured to configured to display a graphical user interface, an inlet for introducing a particle-containing fluid to the particle detector, a sampling region for sampling particles in the fluid and a first processor. The graphical user interface may be configured to set one or more particle monitoring parameters. The first processor may be configured to detect an alarm condition and wirelessly transmit an alarm signal. The remote device may comprise a second electronic display and a second processor. The second processor may be configured to receive the alarm signal, wirelessly query the particle detector for particle sampling data, replicate the graphical user interface of the particle detector on the second electronic display, and pass one or more user instructions from the remote device to the particle detector via the second graphical interface Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
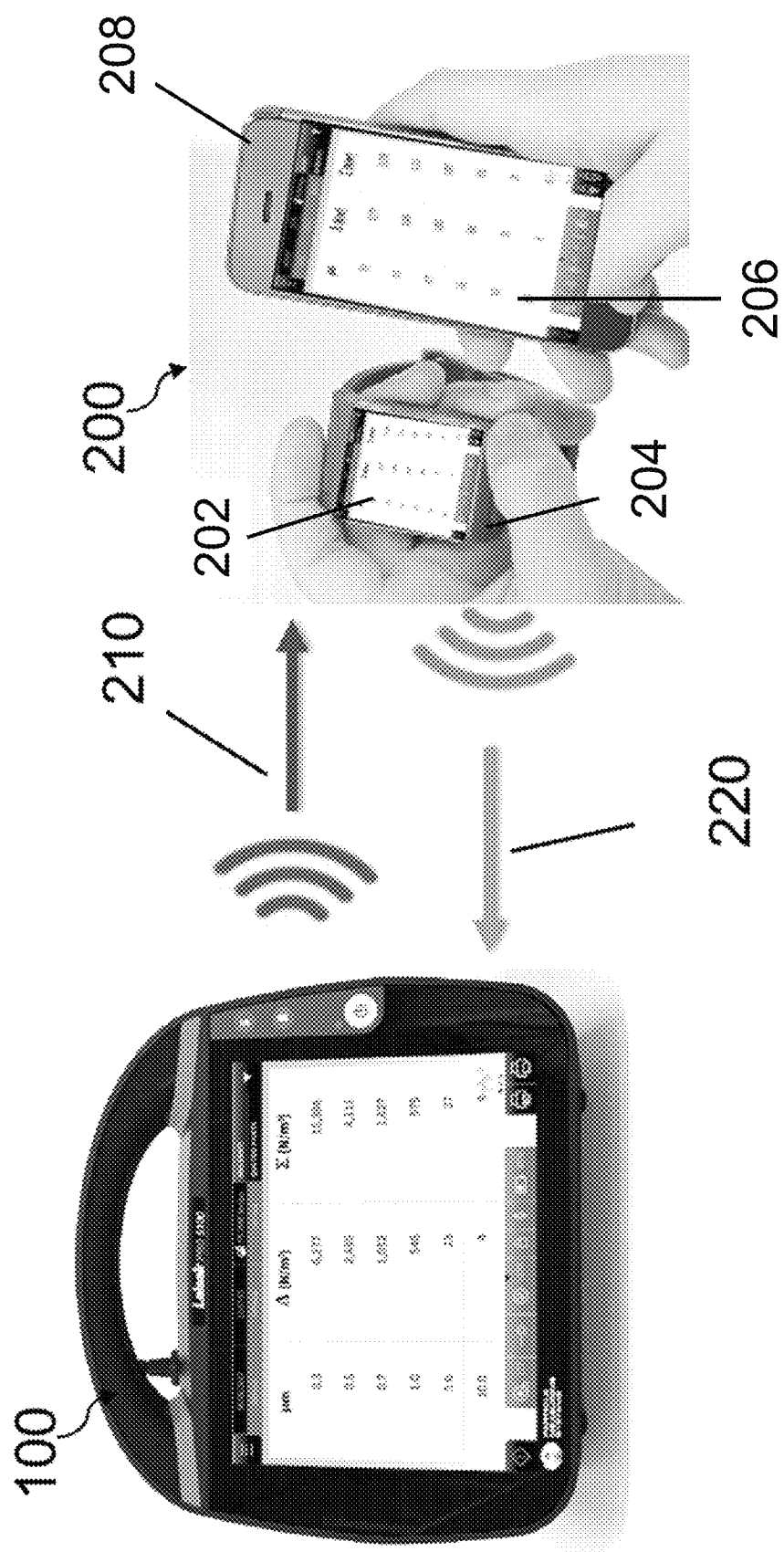
FIG. 1 is a schematic view of a particle detection device and associated remote alarm monitoring devices.
Figure 2:
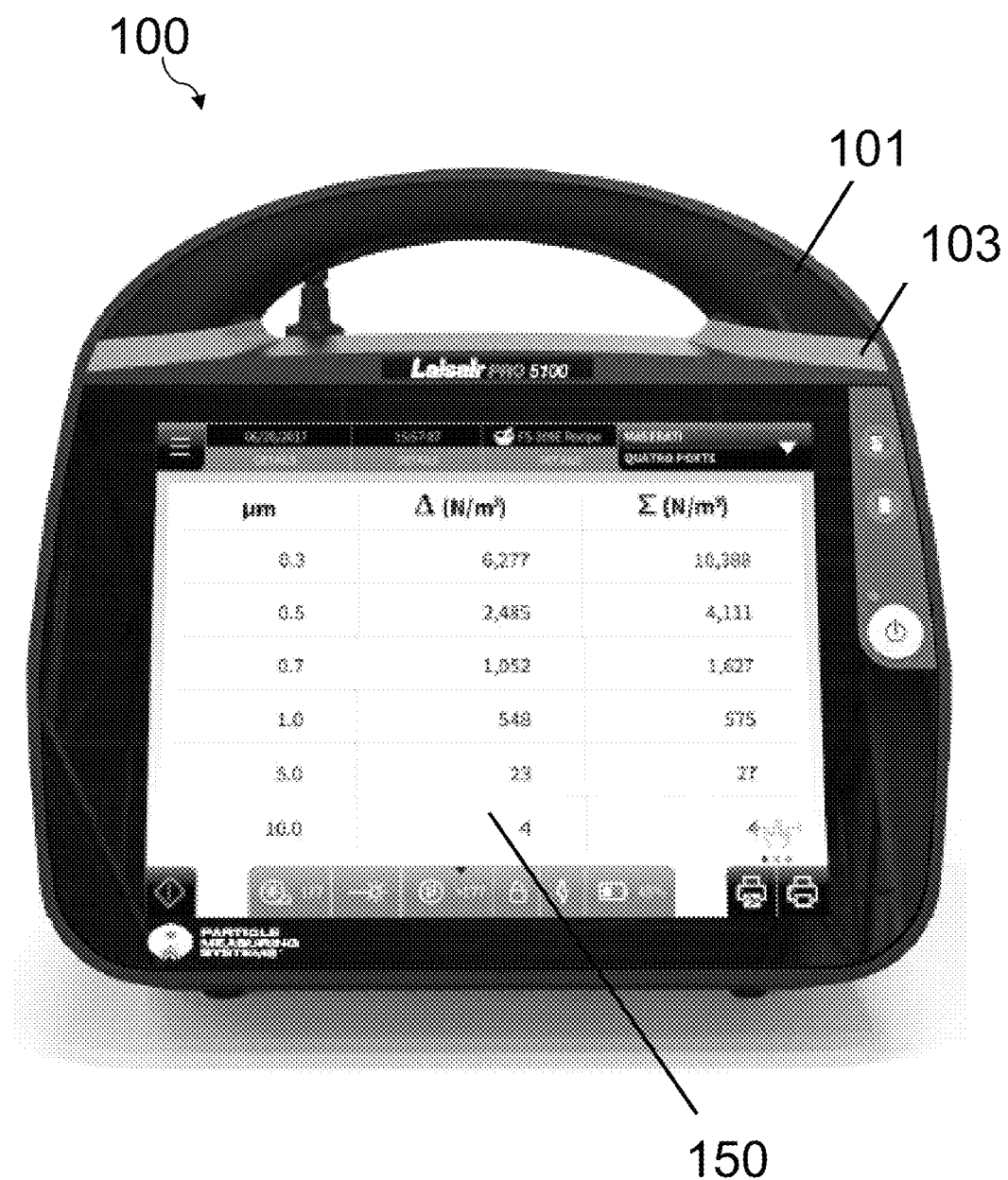
FIG. 2 is a front view of a particle detection device of the present invention.

In general, the terms and phrases used herein have their art-recognized meaning, which can be found by reference to standard texts, journal references and contexts known to those skilled in the art. The following definitions are provided to clarify their specific use in the context of the invention.

"Particle" refers to a small object which is often regarded as a contaminant. A particle can be any material created by the act of friction, for example when two surfaces come into mechanical contact and there is mechanical movement. Particles can be composed of aggregates of material, such as dust, dirt, smoke, ash, water, soot, metal, minerals, or any combination of these or other materials or contaminants. "Particles" may also refer to biological particles, for example, viruses, spores and microorganisms including bacteria, fungi, archaea, protists, other single cell microorganisms. Biological particles include, but are not limited to, microorganisms having a size on the order of 0.1-20 µm. Biological particles include viable biological particles capable of reproduction, for example, upon incubation within a growth media. A particle may refer to any small object which absorbs or scatters light and is thus detectable by an optical particle counter. As used herein, "particle" is intended to be exclusive of the individual atoms or molecules of a carrier fluid, for example, such gases present in air (e.g., oxygen molecules, nitrogen molecules, argon molecule, etc.) or process gases. Some embodiments of the present invention are capable of sampling, collecting, detecting, sizing, and/or counting particles comprising aggregates of material having a size greater than 50 nm, 100 nm, 1 µm or greater, or 10 µm or greater. Specific particles include particles having a size selected from 50 nm to 50 µm, a size selected from 100 nm to 10 µm, or a size selected from 500 nm to 5 µm.

The expression "sampling a particle" broadly refers to collection of particles in a fluid flow, for example, from an environment undergoing monitoring. Sampling in this context includes transfer of particles in a fluid flow to an impact surface, for example, the receiving surface of a growth medium. Alternatively sampling may refer to passing particles in a fluid through a particle analysis region, for example, for optical detection and/or characterization. Sampling may refer to collection of particles having one or more preselected characteristics, such as size (e.g., cross sectional dimension such as diameter, effective diameter, etc.), particle type (biological or nonbiological, viable or nonviable, etc.) or particle composition. Sampling may optionally include analysis of collected particles, for example, via subsequent optical analysis, imaging analysis or visual analysis. Sampling may optionally include growth of viable biological particles, for sample, via an incubation process involving a growth medium. A sampler refers to a device for sampling particles.

"Impactor" refers to a device for sampling particles. In some embodiments, an impactor comprises a sample head including one or more intake apertures for sampling a fluid flow containing particles, whereby at least a portion of the particles are directed onto an impact surface for collection, such as the receiving surface of a growth medium (e.g., culture medium such as agar, broth, etc.) or a substrate such as a filter. Impactors of some embodiments, provide a change of direction of the flow after passage through the intake apertures, wherein particles having preselected characteristics (e.g., size greater than a threshold value) do not make the change in direction and, thus, are received by the impact surface.

The expression "detecting a particle" broadly refers to sensing, identifying the presence of and/or characterizing a particle. In some embodiments, detecting a particle refers to counting particles. In some embodiments, detecting a particle refers to characterizing and/or measuring a physical characteristic of a particle, such as diameter, cross sectional dimension, shape, size, aerodynamic size, or any combination of these. A particle counter is a device for counting the number of particles in a fluid or volume of fluid, and optionally may also provide for characterization of the particles, for example, on the basis of size (e.g., cross sectional dimension such as diameter or effective diameter), particle type (e.g. biological or nonbiological), or particle composition. An optical particle counter is a device that detects particles by measuring scattering, emission or absorbance of light by particles.

"Flow direction" refers to an axis parallel to the direction the bulk of a fluid is moving when a fluid is flowing. For fluid flowing through a straight flow cell, the flow direction is parallel to the path the bulk of the fluid takes. For fluid flowing through a curved flow cell, the flow direction may be considered tangential to the path the bulk of the fluid takes.

"Fluid communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. For example, in one embodiment, the following components of a particle impactor are in fluid communication with one another: one or more intake apertures, an impact surface, a fluid outlet, a flow restriction, a pressure sensor, a flow generating device. In one embodiment, two objects present in a body of fluid are not necessarily in fluid communication with one another unless fluid from the first object is drawn to, past and/or through the second object, such as along a flow path.

"Flow rate" refers to an amount of fluid flowing past a specified point or through a specified area, such as through intake apertures or a fluid outlet of a particle impactor. In one embodiment a flow rate refers to a mass flow rate, i.e., a mass of the fluid flowing past a specified point or through a specified area. In one embodiment, a flow rate is a volumetric flow rate, i.e., a volume of the fluid flowing past a specified point or through a specified area.

"Pressure" refers to a measure of a force exhibited per unit area. In an embodiment, a pressure refers to a force exhibited by a gas or fluid per unit area. An "absolute pressure" refers to a measure of the pressure exerted by a gas or fluid per unit area as referenced against a perfect vacuum or volume exerting zero force per unit area. Absolute pressure is distinguished from a "differential pressure" or "gauge pressure", which refers to a relative change or difference in force exhibited per unit area in excess of or relative to a second pressure, such as an ambient pressure or atmospheric pressure.

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states.

Crosslinked polymers having linked monomer chains are particularly useful for some applications. Polymers useable in the methods, devices and components include, but are not limited to, plastics, elastomers, thermoplastic elastomers, elastoplastics, thermoplastics and acrylates. Exemplary polymers include, but are not limited to, acetal polymers, biodegradable polymers, cellulosic polymers, fluoropolymers, nylons, polyacrylonitrile polymers, polyimide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyurethanes, styrenic resins, sulfone-based resins, vinyl-based resins, rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin or any combinations of these.

FIG. 1 shows a schematic view of a particle detection device: an optical particle detector 100, and associated remote alarm monitoring device(s) 200. The particle detector 100 may include touchscreen display 150. Touchscreen 150 may display a graphical user interface. The graphical user interface may be employed by a user to interact, via the touchscreen 150, with the particle detector 100. For example, one or more particle monitoring parameters may be set, alarm settings may be adjusted, alarms may be cleared, the particle detector 100 may be placed in a sampling, idle, or off mode, and/or the device may be calibrated, via the graphical user interface.

A particle-containing fluid may be introduced to the inlet of the particle detector 100 and the particles may be sampled in the fluid in a sampling region 106 of the particle detector. In response to the sampling step, an alarm condition may be detected. For example, a detected particle concentration may be in excess of a particle concentration threshold. In response to the detecting step, an alarm signal may be generated. An alarm of the particle detector may then be activated. For example, LED light 103 may light up. In another example, the alarm may be an audible alarm of the particle detector. In yet another example the alarm may be a tactile alarm of the particle detector, such as a vibration of the particle detector.

The alarm signal may then be wirelessly transmitted to the remote device via signal 210. An alarm of the remote device may then be activated. For example, the alarm of the remote device may be an audible alarm of the remote device, a visual alarm of the remote device, and/or a tactile alarm of the remote device. In some embodiments, the remote device is a wearable device, such as smartwatch 204. In other embodiments, the remote device is a smartphone 208.

The graphical user interface of the particle detector may be replicated on touchscreen electronic display(s) 202, 206, of the remote device(s). The step of replicating the graphical user interface of the particle detector on the electronic display of the remote device may comprise reproducing one or more icons or visual indicators from the graphical user interface of the particle monitor to the replicate graphical interface of the remote device. In some embodiments, the one or more icons or visual indicators include a battery life indicator, an indicator of the location of the particle detector, and/or an alarm source indicator. In some embodiments, the step of replicating the graphical user interface of the particle detector on the electronic display(s) 202, 206, of the remote device(s) comprises duplicating one or more tables of particle detection data from the graphical user interface of the particle monitor to the replicate graphical interface of the remote device.

The user may wirelessly query the particle detector via the remote device through signal 220. In one embodiment, the wireless querying step may comprise returning particle sampling data from the particle detector to the remote device via signal 210. One or more user instructions may be passed from the remote device to the particle detector via the replicate graphical interface of the remote device. The one or more user instructions may then be executed on the particle detector. The one or more user instructions may comprise adjusting an alarm threshold, acknowledging an alarm, terminating a sampling protocol, and/or initiating a sampling protocol.

Thus, the replication of the graphical user interface from the particle detector to the remote device may allow a user to monitor and control the particle detector from a remote location, and via a graphical user interface that looks and behaves the same as the graphical user interface of the particle detector. Thus training times and/or human errors may be reduced.

In some embodiments, the particle detector is a portable particle detection device. In some embodiments, the particle detector is a particle sampler or a particle counter. In some embodiments, the particle detector is a microbial impactor or an optical particle counter. In some embodiments one or both of signals 210 and 220 may utilize a WiFi communication protocol. In some embodiments one or both of signals 210 and 220 may utilize a BLUETOOTH communication protocol.

Figure 3:
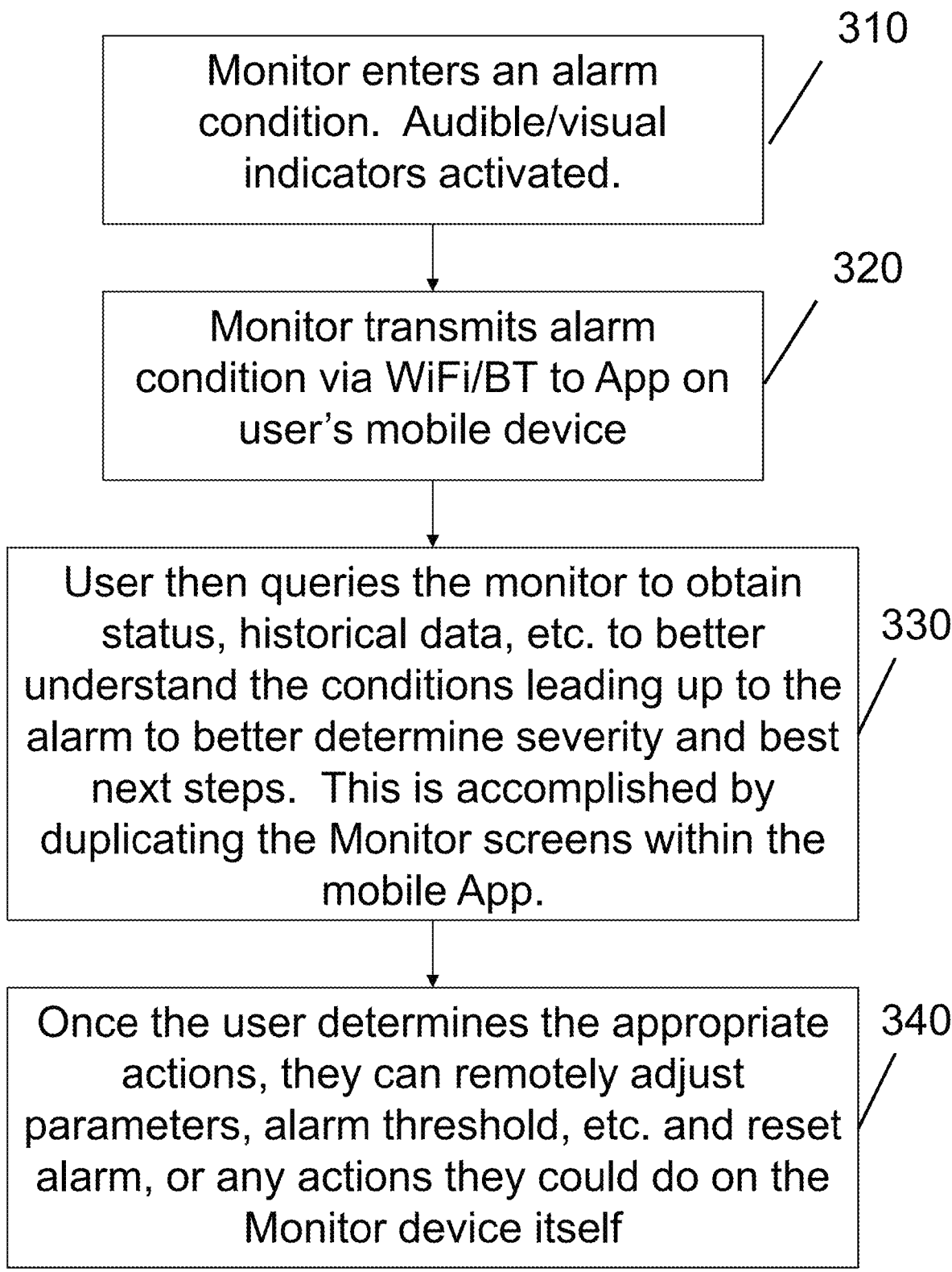
FIG. 3 is a schematic view of a method of alarm monitoring and control of the present invention.

FIG. 3 is a schematic view of a method of alarm monitoring and control of the present invention. As shown a particle monitor may enter an alarm condition and activate audible and/or visual alarm indicators may be activated at step 310. Then, at step 320 the monitor may transmit an alarm condition to an app on a mobile device. At step 330, the user may query the monitor obtain status of the monitor, historical particle data of the monitor, to understand the nature of the alarm and how to best respond. Once the user determines the appropriate response, monitor parameters may be remotely adjusted, alarms may be reset, and/or another action may be taken at step 340.

Figure 4:
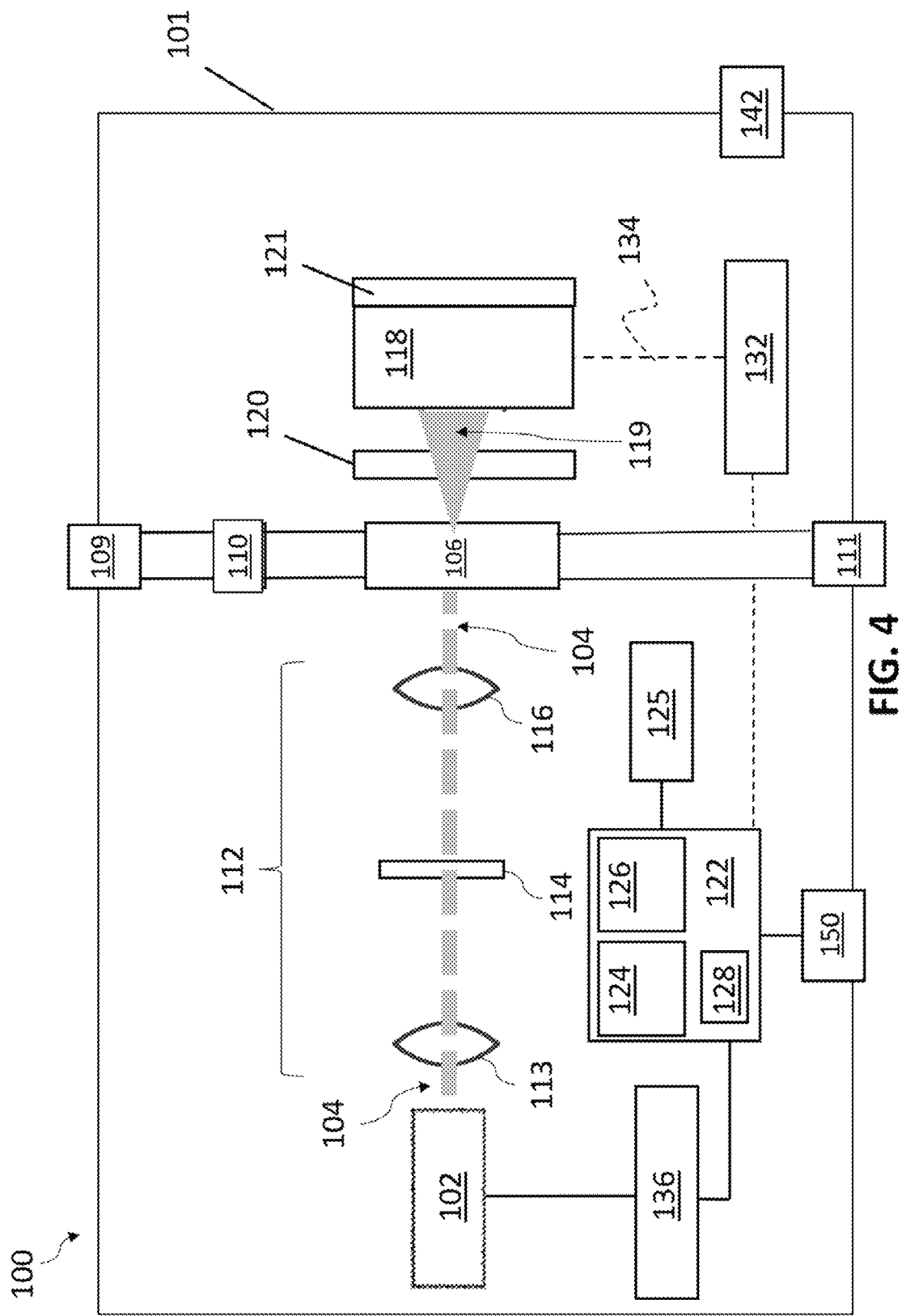
FIG. 4 is a schematic view of the particle detection device of FIG. 1.

FIG. 4 shows an embodiment of an example particle detection device, optical particle analyzer 100. The optical particle analyzer 100 includes an inlet 109 for receiving a particle-containing fluid, a sampling region 106 for detecting particles, and an outlet 111 for discharging the fluid. The sampling region 106 in fluid communication with the inlet 109. The outlet 111 is in fluid communication with the sampling region 106.

The optical particle analyzer 100 includes a housing 101 at least partially enclosing the sampling region 106, and a touchscreen 150 disposed in the housing 101. The touchscreen 150 provides a user interface with the device via an outer surface of the touchscreen.

The optical particle analyzer 100 may include a source of electromagnetic radiation ("EMR") 102 for generating a beam of EMR 104. In one embodiment, the source of EMR 102 includes at least one of a laser, a laser diode, a strip diode laser, a light emitting diode, and an incandescent lamp. In embodiments for which the source of EMR 102 includes the laser, the beam of EMR 104 includes a laser beam. In an embodiment, the laser includes at least one of a laser diode and a strip diode laser.

The optical particle analyzer 100 shown in FIG. 4 includes a sampling region 106 for containing a sample medium and for receiving the beam of EMR 104. The sampling region is enclosed by the housing 101. In some embodiments the sampling region 106 receives the laser beam. The sample medium includes particles and a fluid (e.g., a liquid and/or gas). In an embodiment, the sampling region 106 includes a cuvette. In an embodiment, the sampling region 106 is a flow chamber for containing the sample medium and for receiving the beam of EMR 104. Optical particle analyzer 100 includes a flow inlet 109 and a flow outlet 111 for flowing the fluid through the flow chamber. In an embodiment, the optical particle analyzer 100 may include a filter 110 for filtering the fluid upstream (e.g., before the fluid enters an interior of the flow chamber through inlet 109) of the flow chamber. It is noted that in the case of airborne particles, the air stream of fluid making up the sample medium need not be confined within the sampling region 106.

The optical particle analyzer 100 shown in FIG. 4 includes an optical assembly 112 in optical communication with the source of EMR 102 for directing the beam of EMR 104 from the source of EMR 102 to the sampling region 106. In embodiments for which the source of EMR 102 comprises a laser, the optical assembly 112 may be in optical communication with the laser for directing the laser beam from the laser to the sampling region 106. In an embodiment, the optical assembly 112 may include one or more lenses, masks, and/or filters. In the illustrated embodiment, the optical assembly 112 includes a first lens 113, a mask 114, and a second lens 116 for focusing the beam of EMR 104 inside the sampling region 106. In embodiments for which the source of EMR 102 comprises a laser, the second lens 116 may focus the laser beam inside the sampling region 106.

The optical particle analyzer 100 shown in FIG. 4 includes a detector 118 for detecting scattered radiation 119 from the beam of EMR 104. In embodiments for which the source of EMR 102 includes the laser, the detector 118 detects scattered radiation 119 from the laser beam. The optical particle analyzer 100 includes an optical collection system 120 for directing the scattered radiation 119 from the beam of EMR 104 from the sampling region 106 and to the detector 118. In embodiments for which the source of EMR 102 includes the laser, the optical collection system 120 directs the scattered radiation 119 from the laser beam from the sampling region 106 and to the detector 118. In an embodiment, the optical particle analyzer 100 may include an additional detector for normalization (e.g., a normalization detector 121) for detecting light leaving the sampling region 106.

The optical particle analyzer 100 shown in FIG. 4 may include a computing system 122 having one or more processors 124 and one or more memory devices 126 operably connected to the one or more processors 124. The memory devices 126 include at least one non-transient processor-readable medium capable of storing program instructions encoded as software executable by processor(s) 124. The computing system 122 may include a user interface 128 for facilitating operational interactions and information visualizations and/or manipulations, e.g., via touchscreen display 150, a keyboard and/or other I/O devices by a user of the optical particle analyzer 100 with the computing device 122 and/or other components and subsystems of the optical particle analyzer 100.

The optical particle analyzer 100 shown in FIG. 4 may include amplification circuitry 132 operably coupled to the processor(s) 124 and operably coupled to the detector 118 for amplifying detector signals 134. The optical particle analyzer 100 may include drive circuitry 136 operably coupled to the processor(s) 124 and operably coupled to the source of EMR 102. In embodiments for which the source of EMR 102 includes the laser, the drive circuitry 136 is for the laser.

In an embodiment, processor(s) 124 may execute software stored in memory device(s) 126 for controlling various components of the optical particle analyzer 100 during operation. In an embodiment, the processor(s) 124 may control the source of EMR 102 via the drive circuitry 136 (e.g., by controlling user-specified frequencies, voltages, currents, waveforms, duty cycles, and other control parameters implemented by the drive circuitry 136). In an embodiment, the processor(s) 124 may communicate with wireless antenna 125, for example to establish signal 210 and or 220.

In an embodiment, the processor(s) 124 may provide instructions to control user-specified flow rates and other control parameters implemented by the flow system (not shown). In an embodiment, the processor(s) 124 may receive the detector signal 134 and, after decoding information encoded by the detector signals 134, store the decoded information in the memory device(s) 126. The optical particle analyzer 100 may include a power supply 142 for providing electric power to the various components and systems of the optical particle analyzer 100 requiring electric power to function.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, and methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every combination of components described or exemplified herein can be used to practice the invention, unless otherwise stated.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of operating a particle detector comprising:
   displaying a graphical user interface on an electronic display of the particle detector;
   setting one or more particle monitoring parameters via the graphical user interface;
   introducing a particle-containing fluid to an inlet of the particle detector;
   sampling particles in the fluid in a sampling region of the particle detector;
   in response to the sampling step, detecting an alarm condition;
   in response to the detecting step, wirelessly transmitting an alarm signal to a remote device;
   wirelessly querying the particle detector via the remote device, wherein the querying comprises:
      sending particle sampling data from the particle detector to the remote device; and
      replicating the graphical user interface of the particle detector on an electronic display of the remote device;
   passing one or more user instructions from the remote device to the particle detector via the replicate graphical interface of the remote device;
   executing the one or more user instructions on the particle detector.

2. The method of claim 1, wherein the replicating step comprises:
   reproducing one or more icons or visual indicators from the graphical user interface of the particle monitor to the replicate graphical interface of the remote device.

3. The method of claim 2, wherein the one or more icons or visual indicators include at least one of: a battery life indicator, an indicator of the location of the particle detector, and an alarm source indicator.

4. The method of claim 1, wherein the replicating step comprises:
   duplicating one or more tables of particle detection data from the graphical user interface of the particle monitor to the replicate graphical interface of the remote device.

5. The method of claim 1, wherein the one or more user instructions comprise at least one of: adjusting an alarm threshold, acknowledging an alarm, terminating a sampling protocol, initiating a sampling protocol.

6. The method of claim 1, comprising:
   in response to the detecting step, activating an audible alarm of the particle detector, a visual alarm of the particle detector, or both.

7. The method of claim 1, comprising:
   in response to the wirelessly transmitting step, activating an audible alarm of the remote device, a visual alarm of the remote device, or both.

8. The method of claim 1, comprising:
   in response to the wirelessly transmitting step, activating a tactile alarm of the remote device.

9. The method of claim 8, wherein the tactile alarm comprises vibration of the remote device.

10. The method of claim 1, wherein the remote device is a wearable device.

11. The method of claim 1, wherein the remote device is a smartphone or a smartwatch.

12. The method of claim 1, wherein the particle detector is a portable particle detection device.

13. The method of claim 1, wherein the particle detector is a particle sampler or a particle counter.

14. The method of claim 1, wherein the particle detector is a microbial impactor or an optical particle counter.

15. The method of claim 1, wherein the particle detector is an optical particle detector, the sampling step comprising:
   detecting particles via scattered light in the sampling region of the device.

16. The method of claim 1, wherein the wirelessly transmitting and wirelessly querying steps occur via one of a WiFi or BLUETOOTH communication protocol.

17. A particle detector system comprising:
   a particle detector comprising:
      a first electronic display configured to configured to display a graphical user interface, the graphical user interface configured to set one or more particle monitoring parameters;
      an inlet for introducing a particle-containing fluid to the particle detector system;
      a sampling region for sampling particles in the fluid; and
      a first processor configured to:
         detect an alarm condition;
         wirelessly transmit an alarm signal; and
   a remote device comprising:
      a second electronic display; and
      a second processor configured to:
         receive the alarm signal;
         wirelessly query the particle detector for particle sampling data;
         replicate the graphical user interface of the particle detector on the second electronic display; and
         pass one or more user instructions from the remote device to the particle detector via the second graphical interface.

* * * * *

UNITED STATES PATENT AND TRADEMARK OFFICE
CERTIFICATE OF CORRECTION

| | | |
|---|---|---|
| PATENT NO. | : 10,997,845 B2 | Page 1 of 1 |
| APPLICATION NO. | : 17/063779 | |
| DATED | : May 4, 2021 | |
| INVENTOR(S) | : Scott MacLaughlin et al. | |

It is certified that error appears in the above-identified patent and that said Letters Patent is hereby corrected as shown below:

On the Title Page

Item (72) Inventors:
The correct inventors are, in order, -- Scott MacLAUGHLIN, Boulder CO (US); Matt MICHAELIS, Boulder CO (US); Brian A. KNOLLENBERG, Boulder CO (US) --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*